United States Patent
Gangavaram et al.

(10) Patent No.: US 11,476,889 B2
(45) Date of Patent: Oct. 18, 2022

(54) WIRELESS CIRCUITRY WITH LOOPBACK PATH ALL-PASS FILTERS

(71) Applicant: Apple Inc., Cupertino, CA (US)

(72) Inventors: Krishna Chaitanya Reddy Gangavaram, San Jose, CA (US); Ali Parsa, San Diego, CA (US)

(73) Assignee: Apple Inc., Cupertino, CA (US)

( * ) Notice: Subject to any disclaimer, the term of this patent is extended or adjusted under 35 U.S.C. 154(b) by 10 days.

(21) Appl. No.: 17/191,535

(22) Filed: Mar. 3, 2021

(65) Prior Publication Data

US 2022/0286158 A1 Sep. 8, 2022

(51) Int. Cl.
H04B 1/44 (2006.01)

(52) U.S. Cl.
CPC ..................... H04B 1/44 (2013.01)

(58) Field of Classification Search
CPC .......... H04B 1/40; H04B 1/44; H04B 1/0475; H04W 24/02; H04W 88/02
See application file for complete search history.

(56) References Cited

U.S. PATENT DOCUMENTS

| | | | |
|---|---|---|---|
| 8,295,845 B1 | 10/2012 | Abdollahi-Alibeik et al. | |
| 9,594,147 B2 | 3/2017 | Han et al. | |
| 9,960,864 B2 | 5/2018 | Mow et al. | |
| 10,554,240 B2 | 2/2020 | Han et al. | |
| 10,571,502 B2 | 2/2020 | Pascolini | |
| 2004/0048584 A1 | 3/2004 | Vaidyanathan et al. | |
| 2013/0095776 A1* | 4/2013 | Kavousian | H04B 1/109 455/114.2 |
| 2015/0195050 A1 | 7/2015 | Kim et al. | |
| 2016/0065404 A1 | 3/2016 | Wang et al. | |
| 2018/0048345 A1* | 2/2018 | Pehlke | H04B 1/40 |
| 2018/0198471 A1* | 7/2018 | Cook | H04B 1/38 |
| 2022/0116126 A1* | 4/2022 | Zhou | H04B 7/0619 |

* cited by examiner

*Primary Examiner* — Thanh C Le

(74) *Attorney, Agent, or Firm* — Treyz Law Group, P.C.; Michael H. Lyons

(57) ABSTRACT

An electronic device may include wireless circuitry with a baseband processor, a transceiver, and an antenna. The transceiver may include a transmit path, a receive path, and a loopback path that couples the transmit path to the receive path. A passive all-pass filter may be interposed on the loopback path. Control circuitry may calibrate I/Q mismatch of the wireless circuitry using the all-pass filter to optimize the radio-frequency performance of the wireless circuitry. Performing I/Q mismatch calibration using the all-pass filter may serve to minimize area consumption in the transceiver, may minimize calibration time, and may allow for calibration over a relatively wide bandwidth.

20 Claims, 5 Drawing Sheets

WIRELESS CIRCUITRY WITH LOOPBACK PATH ALL-PASS FILTERS

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry often includes a transmit path for transmitting radio-frequency signals and a receive path for receiving radio-frequency signals.

It can be challenging to form satisfactory wireless circuitry for an electronic device. If care is not taken in the wireless circuitry design, I/Q mismatch on the transmit and receive paths can limit the radio-frequency performance of the wireless circuitry.

SUMMARY

An electronic device may include wireless circuitry. The wireless circuitry may include a processor, a radio-frequency transceiver, and at least one antenna. The radio-frequency transceiver may include a transmit path and a receive path. A loopback path may couple the transmit path to the receive path. A passive all-pass filter may be interposed on the loopback path.

The all-pass filter may have a first output and a second output. Control circuitry may calibrate I/Q mismatch of the wireless circuitry using the all-pass filter to optimize the radio-frequency performance of the wireless circuitry. During calibration, the processor may transmit a test signal that is upconverted to radio frequencies by a mixer on the transmit path. The all-pass filter may output the test signal at the first output with a first phase and may output the test signal at the second output with a second phase. The second phase may be 90 degrees out-of-phase with respect to the first phase. A multiplexer may have a first input coupled to the first output and a second input coupled to the second output. The output of the multiplexer may be communicably coupled to the receive path. A mixer on the receive path may downconvert the test signal to baseband frequencies.

The processor may process the transmitted and received test signal to identify the I/Q mismatch. The processor may generate compensation values based on the identified I/Q mismatch. The processor may compensate subsequently transmitted and/or received signals using the generated compensation values to mitigate the I/Q mismatch in the system. Performing I/Q mismatch calibration using the all-pass filter may serve to minimize area consumption in the transceiver, may minimize calibration time, and may allow for calibration over a relatively wide bandwidth.

An aspect of the disclosure provides a radio-frequency transceiver for wirelessly communicating using at least one antenna. The radio-frequency transceiver can include a transmit path having a first mixer configured to up-convert transmit signals from a baseband frequency to a radio frequency for transmission by the at least one antenna. The radio-frequency transceiver can include a receive path having a second mixer configured to down-convert receive signals received using the at least one antenna from the radio frequency to the baseband frequency. The radio-frequency transceiver can include a loopback path coupling the transmit path to the receive path. The radio-frequency transceiver can include an all-pass filter disposed on the loopback path between the transmit path and the receive path.

An aspect of the disclosure provides an electronic device. The electronic device can include processor circuitry. The electronic device can include at least one antenna. The electronic device can include a transmit path that couples the processor circuitry to the at least one antenna. The electronic device can include a receive path that couples the at least one antenna to the processor circuitry. The electronic device can include a loopback path that couples the transmit path to the receive path. The electronic device can include a passive all-pass filter interposed on the loopback path between the transmit path and the receive path.

An aspect of the disclosure provides a loopback path for conveying differential radio-frequency signals from a transmit path in a radio-frequency transceiver to a receive path in the radio-frequency transceiver. The loopback path can include a first signal line coupled to the transmit path. The loopback path can include a second signal line coupled to the transmit path, the first and second signal lines forming a differential pair of signal lines. The loopback path can include an all-pass filter having a first input terminal coupled to the first signal line, a second input terminal coupled to the second signal line, a first output configured to output the differential radio-frequency signals with a first phase, and a second output configured to output the differential radio-frequency signals with a second phase that is 90 degrees out-of-phase with respect to the first phase. The loopback path can include a multiplexer having a first input coupled to the first output of the all-pass filter, a second input coupled to the second output of the all-pass filter, and a third output communicably coupled to the receive path. The multiplexer can have a first state in which the first input is coupled to the third output and a second state in which the second input is coupled to the third output.

DETAILED DESCRIPTION

Figure 1:
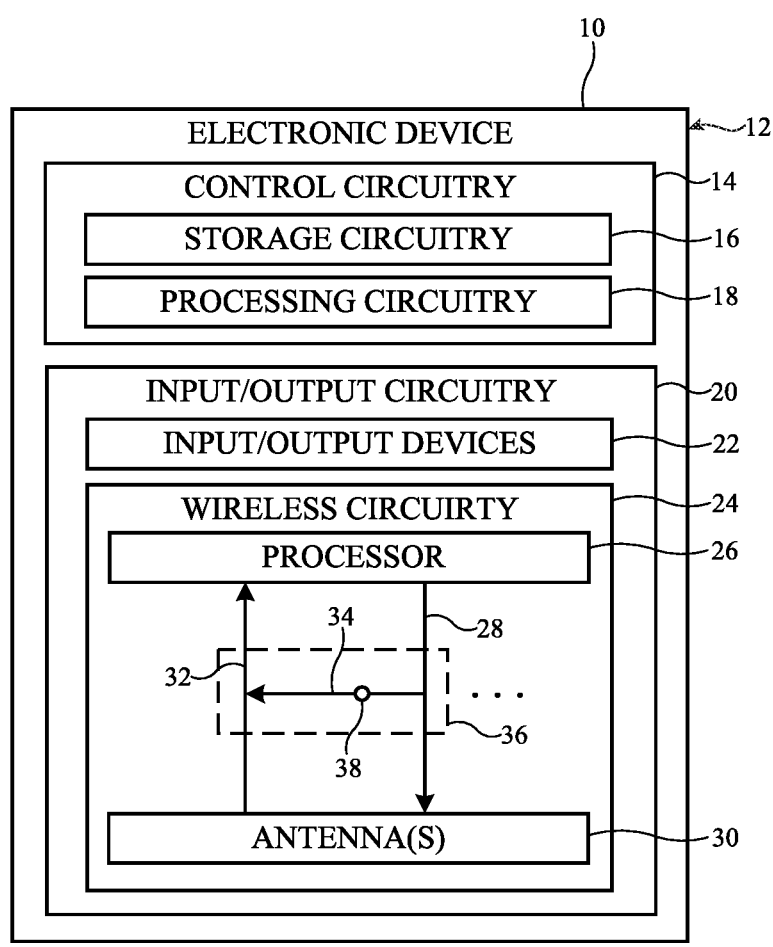
FIG. 1 is a functional block diagram of an illustrative electronic device having wireless circuitry with a loopback path between transmit and receive paths in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more processors such as processor 26, radio-frequency transceiver circuitry such as radio-frequency transceiver 36, and one or more antennas 30. While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, some or all of processor 26 may form a part of control circuitry 14. Processor 26 may be, for example, a baseband processor (e.g., in embodiments where wireless circuitry 24 is being used to convey radio-frequency signals using a cellular communications protocol). While referred to herein as a "processor," processor 26 may include any desired number of one or more processors. Processor 26 may also sometimes be referred to herein as processor circuitry.

Processor 26 may be coupled to antenna(s) 30 over one or more transmit paths such as transmit path 28 and over one or more receive paths such as receive path 32. Radio-frequency transceiver 36 may be interposed on transmit path 28 and receive path 32. If desired, radio-frequency front end circuitry may be interposed on transmit path 28 and/or receive path 32 (e.g., between radio-frequency transceiver 36 and antenna(s) 30). The radio-frequency front end circuitry may include switching circuitry, filter circuitry, impedance matching circuitry, radio-frequency couplers, sensor circuitry, and/or any other desired front end circuitry that may, if desired, be integrated into one or more radio-frequency front end modules (e.g., modules having multiple front end components mounted onto a common substrate, package, integrated circuit, or chip).

In the example of FIG. 1, wireless circuitry 24 is illustrated as including only a single processor 26 and a single radio-frequency transceiver 36 for the sake of clarity. In general, wireless circuitry 24 may include any desired number of processors 26, any desired number of radio-frequency transceivers 36, and any desired number of antennas 30. Transmit path 28 and receive path 32 may each include radio-frequency transmission lines, baseband paths, and/or other signal paths that serve to couple processor 26 to antenna(s) 30 via radio-frequency transceiver 36. The radio-frequency transmission lines may be coupled to antenna feeds on antenna(s) 30. Antenna(s) 30 may radiate radio-frequency signals into free space when the radio-frequency signals are fed to the antenna(s) over the antenna feeds. Conversely, antenna(s) 30 may receive radio-frequency signals from free space and may convey the radio-frequency signals to the radio-frequency transmission lines over the antenna feeds. The radio-frequency transmission lines may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device may be integrated into rigid and/or flexible printed circuit boards if desired.

During signal transmission, processor 26 may generate baseband signals on transmit path 28 that include wireless data to be transmitted by antenna(s) 30. Upconversion circuitry on transmit path 28 (e.g., in radio-frequency transceiver 36) may upconvert the baseband signals to a corresponding carrier (radio) frequency. Similarly, during signal reception, downconversion circuitry on receive path 32 (e.g., in radio-frequency transceiver 36) may downconvert radio-frequency signals received by antenna(s) 30 from the carrier frequency to baseband. The carrier frequency may lie within a corresponding frequency band (sometimes referred to herein as a communications band or simply as a "band"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Antenna(s) 30 may be formed using any desired antenna structures. For example, antenna(s) 30 may include an antenna with a resonating element that is formed from loop antenna structures, patch antenna structures, inverted-F antenna structures, slot antenna structures, planar inverted-F antenna structures, helical antenna structures, monopole antennas, dipoles, hybrids of these designs, etc.

Transmit path 28 (sometimes referred to herein as transmit chain 28) may include components involved in the transmission of radio-frequency signals using antenna(s) 30 such as one or more upconverters, filters, switches, baluns, amplifiers, digital-to-analog converters, etc. Receive path 32 (sometimes referred to herein as receive chain 32) may include components involved in the reception of radio-frequency signals using antenna(s) 30 such as one or more downconverters, filters, switches, baluns, amplifiers, analog-to-digital converters, etc. Transmit signals on transmit path 36 and receive signals on receive path 32 may include in-phase quadrature-phase (I/Q) signals. The I/Q signals include an in-phase (I) component and a quadrature-phase (Q) component. Non-idealities in the components of wireless circuitry 24 can introduce undesirable I/Q mismatch (sometimes referred to as I/Q imbalance) in transmit path 28 and receive path 32 (e.g., where there is not an exact 90-degree phase delay between the I and Q components and/or where the I and Q components do not have the same amplitude). The I/Q mismatch can include frequency-dependent I/Q mismatch (FD-IQMM) and/or frequency-independent I/Q mismatch (FI-IQMM). If care is not taken, the I/Q mismatch can undesirably limit the radio-frequency performance of wireless circuitry 24 (e.g., by undesirably limiting the signal-to-noise ratio (SNR) floor of the system).

In order to compensate for I/Q mismatch to optimize the radio-frequency performance of wireless circuitry 24, one or more loopback paths such as loopback path 34 may be coupled between transmit path 28 and receive path 32. Loopback path 34 (sometimes referred to herein as feedback path 34) may be formed as a part of radio-frequency transceiver 36 or may be external to radio-frequency transceiver 36. If desired, each of the components of radio-frequency transceiver 36 may be formed as a part of a radio-frequency transceiver module in which each of the components are integrated onto a single substrate (e.g., a rigid or flexible printed circuit board), integrated circuit, chip, or package.

Transmit signals on transmit path 28 may be conveyed from transmit path 28 to receiver circuitry on receive path 32 via loopback path 34. Wireless circuitry 24 may measure the transmit signals received by receive path 32 via loopback path 34 to measure, identify, or estimate the I/Q mismatch of wireless circuitry 24. Control circuitry 14 may identify correction factors based on the identified I/Q mismatch. Control circuitry 14 may apply the correction factors to subsequently transmitted and/or received signals to compensate for the identified I/Q mismatch. In other words, control circuitry 14 may calibrate the radio-frequency performance of wireless circuitry 24 based on the identified I/Q mismatch. This calibration may serve to optimize the radio-frequency performance of wireless circuitry 24.

In some scenarios, calibration of I/Q mismatch is performed using a dedicated feedback receiver, using off-chip couplers, or using poly-phase filters. However, these components can occupy an excessive amount of area within radio-frequency transceiver 36 and may exhibit limited bandwidth. Calibration using these components also involves sequentially calibrating the I/Q mismatch for the transmit path and then using the calibrated transmit path to calibrate the I/Q mismatch for the receive path. This type of sequential calibration can take an excessive amount of time. In order to calibrate the I/Q mismatch for wireless circuitry 24 while minimizing chip area, maximizing bandwidth, and minimizing calibration time, an all-pass filter such as all-pass filter 38 may be interposed on loopback path 34. All-pass filter 38 may pass each frequency of the transmit signals on transmit path 28 with substantially equal gain, while also altering the phase relationship between different frequencies of the transmit signals. All-pass filter 38 is a passive component (and may therefore sometimes be referred to herein as passive all-pass filter 38) and may introduce a phase shift in loopback path 34 (e.g., a 90-degree phase shift) that allows for the calibration of I/Q mismatch in both transmit path 28 and receive path 32 simultaneously, thereby minimizing the time required for calibration. All-pass filter 38 may therefore sometimes also be referred to herein as phase shifter 38, 90-degree phase shifter 38, passive phase shifter 38, or passive 90-degree phase shifter 38.

Figure 2:
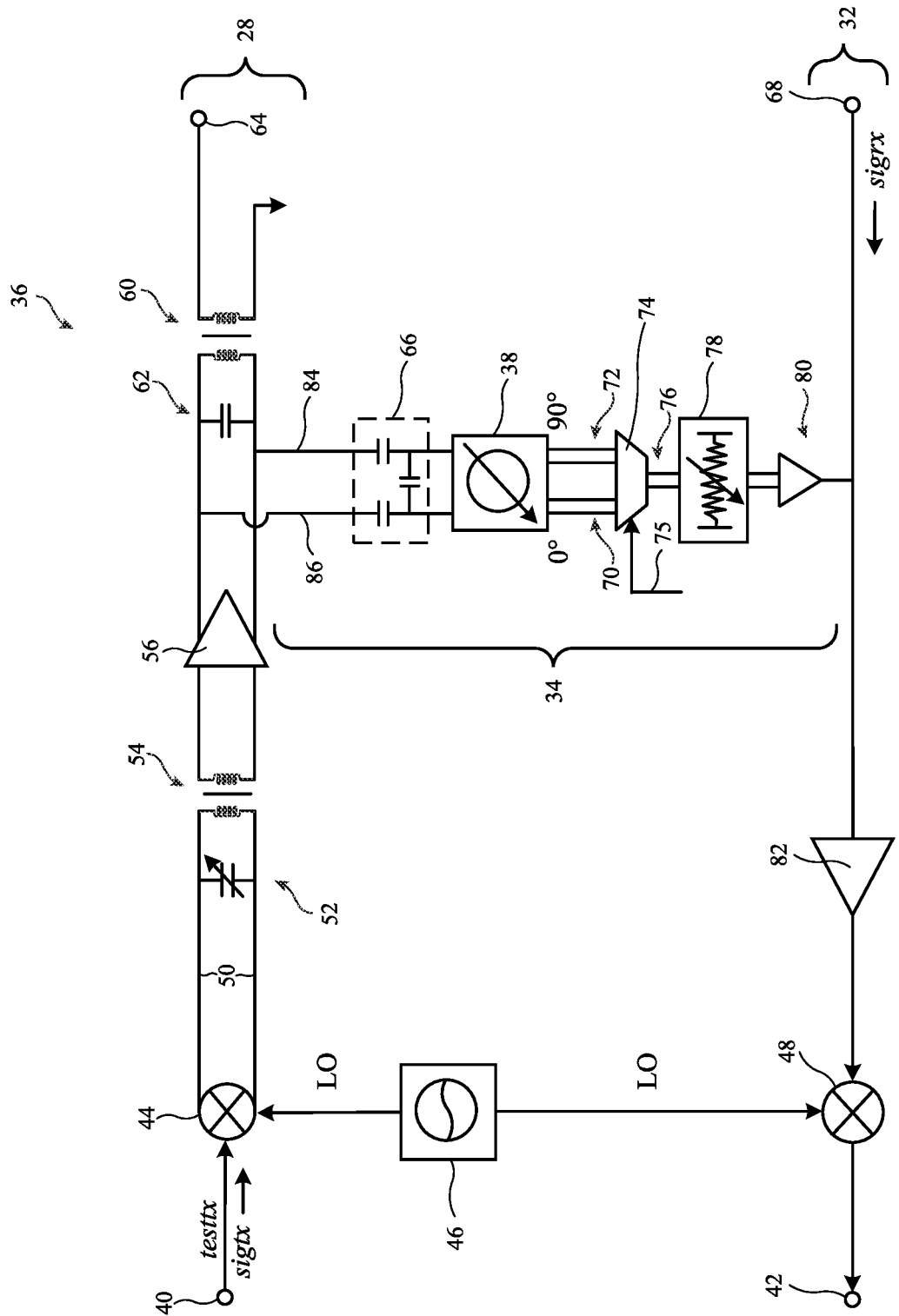
FIG. 2 is a circuit diagram of illustrative wireless circuitry having an all-pass filter interposed on a loopback path between transmit and receive paths in accordance with some embodiments.

FIG. 2 is a circuit diagram showing one example of how an all-pass filter may be interposed on loopback path 34. As shown in FIG. 2, radio-frequency transceiver 36 may include a portion of transmit path 28 and a portion of receive path 32 (e.g., between processor 26 and antenna(s) 30 of FIG. 1). Radio-frequency transceiver 36 may include a first port 40 in transmit path 28 that is communicably coupled to processor 26 and a second port 64 in transmit path 28 that is communicably coupled to antenna(s) 30. Radio-frequency transceiver 36 may also include a third port 42 in receive path 32 that is communicably coupled to processor 26 and a fourth port 68 that is communicably coupled to antenna(s) 30.

Transmit path 28 may include an up-converter such as mixer 44. Mixer 44 may have a first input coupled to port 40 and a second input coupled to local oscillator (LO) generator 46. LO generator 46 may include a voltage-controlled oscillator (VCO), a phase-locked loop, and/or other clocking circuitry for generating a local oscillator signal LO provided to the second input of mixer 44. During signal transmission, radio-frequency transceiver 36 may receive transmit signals sigtx at a baseband frequency from processor 26 (FIG. 1). Mixer 44 may mix the transmit signals sigtx received at its first input with the local oscillator signal LO received at its second input to upconvert transmit signals sigtx to radio frequencies. The radio-frequency transmit signals sigtx may be I/Q signals.

A first balun such as balun 54 may have an input coupled to output 50 of mixer 44. A tuning capacitor such as capacitor 52 may be coupled to the input of balun 54. The output of balun 54 may be coupled to the input of power amplifier (PA) driver 56. Balun 54 may convert radio-frequency transmit signals sigtx at output 50 of mixer 44 into differential signals (e.g., a differential signal pair conveyed over a differential signal path). The output of PA driver 56 may be coupled to the input of a second balun such as balun 60. PA driver 56 may amplify differential transmit signals sigtx. A tuning capacitor such as tuning capacitor 62 may be coupled to the input of balun 60. The output of balun 60 may be coupled to port 64. Balun 60 may convert the differential transmit signals sigtx amplified by PA driver 56 into single-ended signals provided to port 64 for transmission over antenna(s) 30.

Receive path 32 may include one or more amplifiers such as low noise amplifier (LNA) 82. The input of LNA 82 may be coupled to port 68. The output of LNA 82 may be coupled to a first input of a downconverter such as mixer 48. Mixer 48 may also have a second input that receives local oscillator signal LO from LO generator 46. During signal reception, LNA 82 may receive radio-frequency signals from antenna(s) 30 via port 68. LNA 82 may amplify the received radio-frequency signals. Mixer 48 may mix the received radio-frequency signals with local oscillator signal LO to downconvert the received signals to baseband. The received baseband signals may be provided to processor 26 (FIG. 1) via port 42.

Loopback path 34 may have an input coupled to the output of PA driver 56 and the input of balun 60. Loopback path 34 is a differential signal path having a differential pair of signal lines (conductors) 86 and 84. The output of loopback path 34 may be coupled to receive path 32 (e.g., at the input of LNA 82). AC coupling and attenuation capacitors 66 may be interposed on loopback path 34. AC coupling and attenuation capacitors 66 may include any desired number of capacitors arranged in any desired manner on and/or between signal lines 86 and 84. AC coupling and attenuation capacitors 66 may perform an initial attenuation on transmit signals received from PA driver 56. AC coupling and attenuation capacitors 66 may also contribute to the center frequency tuning of balun 60 (e.g., with tuning capacitor 62).

All-pass filter 38 may be interposed on loopback path 34 between AC coupling attenuation capacitors 66 and receive path 32. All-pass filter 38 may have a first input coupled to signal line 86 and a second input coupled to signal line 84. All-pass filter 38 may also have a first output 70 and a second output 72. Second output 72 may be out of phase with (e.g., 90 degrees out of phase with) first output 70. A switch such as multiplexer 74 may be interposed on loopback path 34 between all-pass filter 38 and receive path 32. Multiplexer 74 may have a first input coupled to output 70 of all-pass filter 38 and may have a second input coupled to output 72 of all-pass filter 38. Multiplexer 74 may have an output 76 communicably coupled to receive path 32. Multiplexer 74 may have a control input that receives control signals 75 from control circuitry 14 (FIG. 1). Control signals 75 may selectively place multiplexer 74 into one of at least first and second states. In the first state, the first input of multiplexer 74 (e.g., output 70 of all-pass filter 38) is coupled to the output 76 of multiplexer 74. In the second state, the second input of multiplexer 74 (e.g., output 72 of all-pass filter 38) is coupled to the output 76 of multiplexer 74. If desired, multiplexer 74 may have a third state at which both the first and second inputs are decoupled from output 76.

If desired, a programmable attenuator such as programmable attenuator 78 may be interposed on loopback path 34 between output 76 of multiplexer 74 and receive path 68. A differential-to-single-ended signal converter such as converter 80 may be interposed on loopback path 34 between the output of programmable attenuator 78 and receive path 68. Programmable attenuator 78 may provide a selected amount of attenuation to signals output by multiplexer 74 (e.g., control circuitry 14 of FIG. 1 may actively adjust the amount of attenuation introduced by programmable attenuator over time). Converter 80 may convert the differential signals output by programmable attenuator 78 into single-ended signals provided to the input of LNA 82 on receive path 32.

Radio-frequency transceiver 36 may transmit the transmit signals sigtx during wireless data transmission (e.g., transmit signals sigtx may convey wireless data for transmission by antenna(s) 30 and receipt by external communications equipment). Radio-frequency transceiver 36 may also receive radio-frequency signals from the external communications equipment. During calibration for I/Q mismatch, processor 26 (FIG. 1) may transmit test signals testtx for use in identifying the I/Q mismatch of radio-frequency transceiver 36. Mixer 44 may up-convert test signals testtx to radio frequencies. Balun 54 may convert radio-frequency test signals testtx to differential signals. PA driver 56 may amplify differential test signals testtx. Loopback path 34 may route the differential test signals testtx from transmit path 28 back to receive path 32.

AC coupling and attenuation capacitors 66 may attenuate differential test signals testtx by a fixed amount (e.g., 2-8 dB). This may, for example, help to compensate for any excessive magnitude in the differential test signals after amplification by PA driver 56. All-pass filter 38 may pass all frequencies of the differential test signals with substantially constant gain. However, all-pass filter 38 may output the differential test signals with a first phase (e.g., zero degrees) at first output 70 while also outputting the differential test signals with a second phase (e.g., ninety degrees or any other phase that is ninety degrees out-of-phase with respect to the first phase) at second output 72. In other words, all-pass filter 38 may apply a 90-degree phase shift to the signals as produced at output 72 relative to the signals as produced at output 70. All-pass filter 38 may perform this phase shifting operation passively and without the use of active (powered) components. Outputs 70 and 72 are each differential signal paths.

During calibration operations, control signals 75 may control multiplexer 74 to couple output 70 of all-pass filter 38 to programmable attenuator 78 (e.g., so the differential test signals with the first phase are provided to receive path 32) at a first time. At a second time, control signals 75 may control multiplexer 74 to couple output 72 of all-pass filter 38 to programmable attenuator 78 at (e.g., so the differential test signals with the second phase are provided to receive path 32). Differential attenuator 78 may help to reduce the magnitude of the signals provided to LNA 82. Converter 80 may convert the differential test signals to single-ended test signals that are provided to LNA 82. LNA 82 may amplify the test signals received over loopback path 34. Mixer 48 may down-convert the test signals received over loopback path 34 to baseband. Radio-frequency transceiver 36 may provide the baseband test signals to processor 26 (FIG. 1) over port 42.

Processor 26 may process the received test signals to identify the I/Q mismatch of radio-frequency transceiver 36 (e.g., by comparing the phases and magnitudes of the I/Q test signals received via loopback path 34 to the known phases and magnitudes of the I/Q test signals transmitted by mixer 44). Processor 26 may then identify compensation factors based on the identified I/Q mismatch. Processor 26 may apply the identified compensation factors to subsequently transmitted signals sigtx and/or to subsequently received signals that serve to mitigate the identified I/Q mismatch, thereby optimizing radio-frequency performance for radio-frequency transceiver 36. The example of FIG. 2 is merely illustrative and, if desired, additional circuit components may be interposed at different locations on transmit path 28, receive path 32, and/or loopback path 34.

Figure 3:
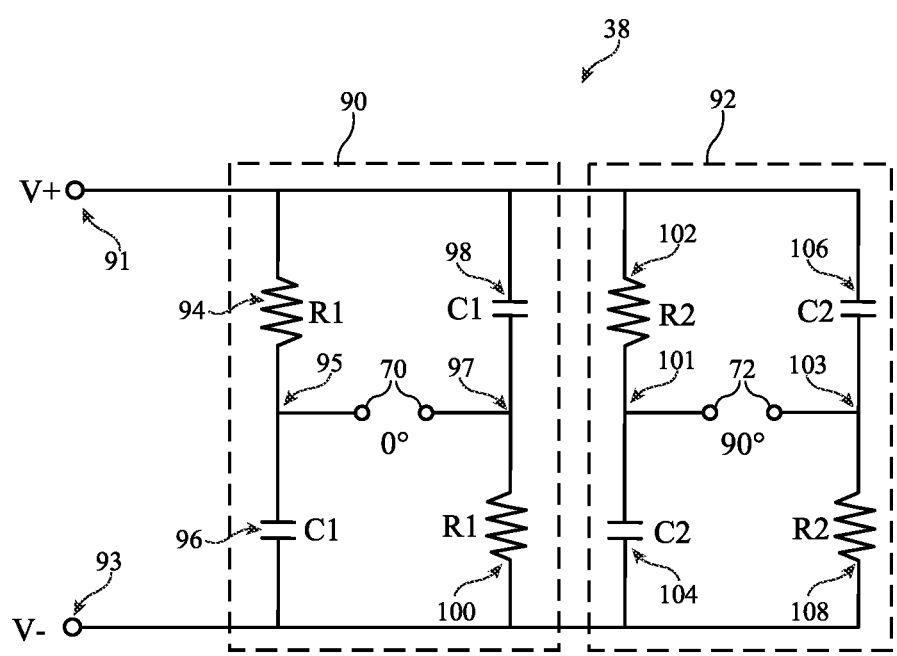
FIG. 3 is a circuit diagram of an illustrative all-pass filter in accordance with some embodiments.

FIG. 3 is a circuit diagram of all-pass filter 38 in one suitable implementation. As shown in FIG. 3, all-pass filter 38 may have a first input terminal 93 and a second input terminal 91. Input terminal 91 may be coupled to signal line 84 and input terminal 93 may be coupled to signal line 86 (FIG. 3). Input terminal 91 therefore receives a first signal $(V_+)$ of the differential signal pair provided to loopback path 34 (e.g., differential test signals testtx) whereas input terminal 93 receives a second signal $(V_-)$ of the differential signal pair.

In the example of FIG. 3, all-pass filter 38 is a second order all-pass filter having a first all-pass filter circuit (stage) 90 that couples input terminals 91 and 93 to first output 70 and a second all-pass filter circuit (stage) 92 that couples input terminals 91 and 93 to second output 72. First all-pass filter circuit 90 may include a first resistor 94 having resistance R1 and a first capacitor 96 having capacitance C1 coupled in series between input terminals 91 and 93. First all-pass filter circuit 90 may also include a second capacitor 98 having capacitance C1 and a second resistor 100 having resistance R1 coupled in series between input terminals 91 and 93 (e.g., in parallel with resistor 94 and capacitor 96). First output 70 may be coupled to circuit node 95 between resistor 94 and capacitor 96 and may be coupled to circuit node 97 between capacitor 98 and resistor 100.

Second all-pass filter circuit 92 may include a third resistor 102 having resistance R2 and a third capacitor 104 having capacitance C2 coupled in series between input terminals 91 and 93. Second all-pass filter circuit 92 may also include a fourth capacitor 106 having capacitance C2 and a fourth resistor 108 having resistance R2 coupled in series between input terminals 91 and 93 (e.g., in parallel with resistor 102 and capacitor 104). Second output 72 may be coupled to circuit node 101 between resistor 102 and capacitor 104 and may be coupled to circuit node 103 between capacitor 106 and resistor 108. Capacitance C1 and resistance R1 may be selected such that the differential test signals received at input terminals 91 and 93 are output at first output 70 with a first phase (e.g., zero degrees). At the same time, capacitance C2 and resistance R2 may be selected such that the differential test signals received at input terminals 91 and 93 are output at second output 72 with a second phase (e.g., 90 degrees) that is 90 degrees out of phase with respect to the first phase.

When configured in this way, all-pass filter 38 may cover a relatively wide bandwidth (e.g., for covering 5-7 GHz frequency channels). All-pass filter 38 is fully passive and no additional switches are needed on transmit path 28 (FIG. 2) as would otherwise be required for off-chip couplers. Any loading of balun 60 (FIG. 2) by the capacitors in all-pass filter 38 during transmission of transmit signals sigtx may be compensated for by other tuning circuitry in the system. If desired, the same type of capacitors and resistors may be used in both all-pass filter circuits 90 and 92 to minimize process variations. To achieve satisfactory phase accuracy, a certain amount of isolation may be needed between the transmit and receive paths (e.g., more than 40 dB).

The example of FIG. 3 is merely illustrative. All-pass filter 38 may include other resistive components, capacitive components, or other circuit components arranged in any desired manner (e.g., for covering desired frequency ranges of interest). All-pass filter 38 need not be a second order all-pass filter and may, if desired, be a third order all-pass filter, a fourth order all-pass filter, or a higher order all-pass filter.

Figure 4:
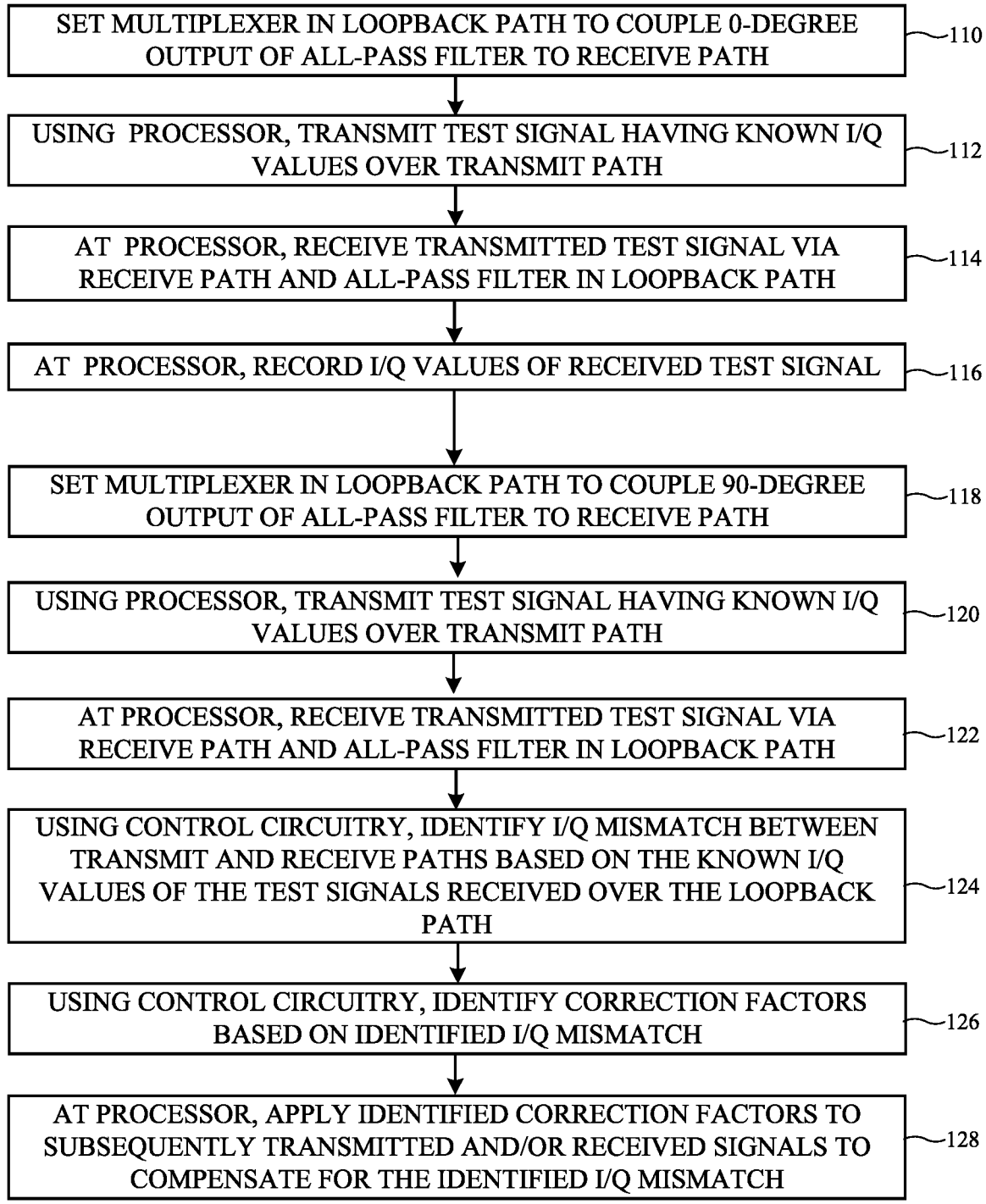
FIG. 4 is a flow chart of illustrative operations involved in calibrating wireless circuitry using an all-pass filter in a loopback path in accordance with some embodiments.

FIG. 4 is a flow chart of illustrative operations that may be involved in calibrating I/Q mismatch for wireless circuitry 24 (FIG. 1) using all-pass filter 38. The operations of FIG. 4 may be performed during a calibration mode of operation (e.g., during which wireless circuitry 24 stops transmitting transmit signals sigtx of FIG. 2). The calibration operations may be performed during the manufacture or assembly of device 10 (e.g., in a manufacturing, factory, or assembly, testing, or verification system) and/or may be performed during regular operation of device 10 by an end user.

At operation 110, control circuitry 14 may use control signals 75 (FIG. 2) to control multiplexer 74 to couple first output 70 of all-pass filter 38 to output 76 and thus to receive path 32.

At operation 112, processor 26 may transmit test signal testtx. Mixer 44 may up-convert test signal testtx to radio frequency signals having known I/Q components/values. Balun 54 may convert radio-frequency test signal testtx to differential signals. PA driver 56 may amplify differential test signal testtx. Loopback path 34 may route the amplified differential test signal to receive path 68. AC coupling and attenuation capacitors may attenuate the differential test signal if desired. All-pass filter 38 may pass the differential test signal from its input (e.g., input terminals 91 and 93 of FIG. 3) to first output 70 at a first phase (e.g., zero degrees) and to second output 72 at a second phase that is 90 degrees out of phase with respect to the first phase (e.g., 90 degrees). Multiplexer 74 may route the differential test signal at the first phase from first output 70 to its output 76. Programmable attenuator 78 may apply a selected attenuation (or no attenuation) to the differential test signal at the first phase. Converter 80 may convert the differential test signal at the first phase into a single-ended signal. LNA 82 may amplify the test signal at the first phase. Mixer 48 may downconvert the test signal at the first phase to a corresponding baseband signal.

At operation 114, processor 26 may receive the baseband test signal at the first phase (e.g., via receive path 32 and loopback path 34).

At operation 116, processor 26 may identify and record (store) the I/Q components/values of the received baseband test signal at the first phase for subsequent processing.

At operation 118, control circuitry 14 may use control signals 75 (FIG. 2) to control multiplexer 74 to couple second output 72 of all-pass filter 38 to output 76 and thus to receive path 32.

At operation 120, processor 26 may continue to transmit test signal testtx. Multiplexer 74 may route the differential test signal at the second phase from second output 72 to programmable attenuator 78. Programmable attenuator 78 may apply a selected attenuation (or no attenuation) to the differential test signal at the second phase. Converter 80 may convert the differential test signal at the second phase into a single-ended signal. LNA 82 may amplify the test signal at the second phase. Mixer 48 may downconvert the test signal at the second phase to a corresponding baseband signal.

At operation 122, processor 26 may receive the baseband test signal at the second phase (e.g., via receive path 32 and loopback path 34). Processor 26 may identify the I/Q components/values of the received baseband test signal at the second phase.

At operation 124, control circuitry 14 (e.g., at processor 26) may identify any I/Q mismatch in radio-frequency transceiver 36 based on the identified I/Q components of the received test signal at the first phase, the received test signal at the second phase, and the known I/Q components of the transmitted test signals. The I/Q mismatch may, for example, correspond to differences in the identified I/Q components of the received test signals versus the known I/Q components of the transmitted test signals.

At operation 126, control circuitry 14 (e.g., at processor 26) may identify correction factors based on the identified I/Q mismatch. The calibration procedure may subsequently end. Wireless circuitry 24 may then return to a normal communications mode in which processor 26 transmits transmit signals sigtx.

At operation 128, processor 26 may apply the identified correction factors to transmit signals sigtx and/or to any signals received by antenna(s) 30. The correction factors may serve to compensate for the identified I/Q mismatch such that, after the correction factors have been applied, there is no more I/Q mismatch in the transmitted or received signals. This may serve to optimize the radio-frequency performance of wireless circuitry 24. The operations of FIG. 4 may be repeated periodically over time, upon demand by a user or application running on device 10, or in response to any other trigger condition (e.g., to ensure that I/Q mismatch remains calibrated even if the I/Q mismatch changes over time).

Figure 5:
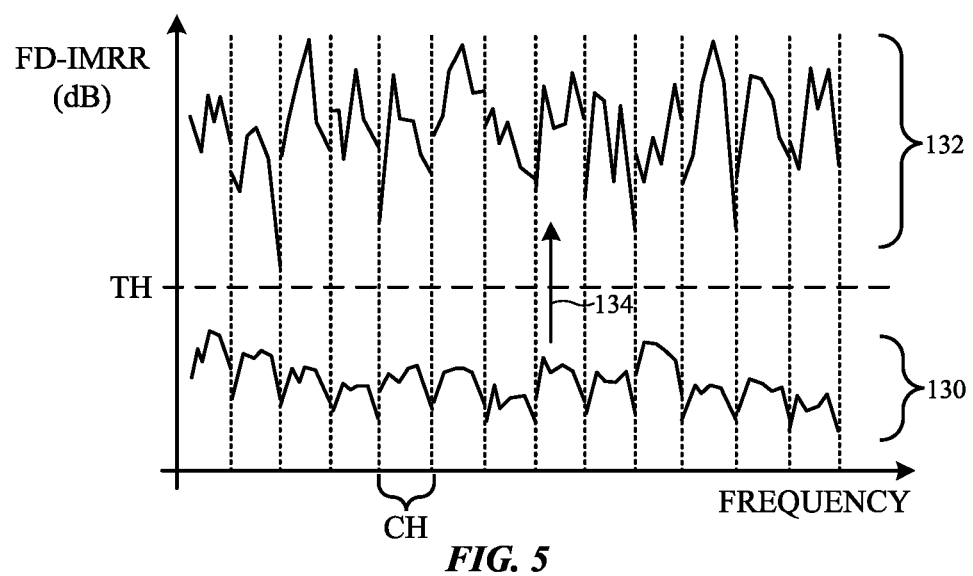
FIG. 5 is a plot of frequency dependent image rejection ratio (IMRR) as a function of frequency for illustrative wireless circuitry calibrated using an all-pass filter in a loopback path in accordance with some embodiments.

FIG. 5 is a plot of received frequency dependent image rejection ratio (FD-IMRR) as a function of frequency (e.g., across multiple transmit/receive channels CH) showing how calibrating I/Q mismatch can optimize the radio-frequency performance of wireless circuitry 24. Curve 130 plots the received IMRR prior to calibration using all-pass filter 38. As shown by curve 130, the received IMRR is below a minimum threshold IMRR value TH associated with a minimum satisfactory IMRR (e.g., 50 dB). Curve 132 plots the received IMRR after calibration using all-pass filter 38 (e.g., using the operations of FIG. 4). As shown by arrow 134, calibrating wireless circuitry 24 using all-pass filter 38 may serve to increase the received IMRR of wireless circuitry 24 above minimum threshold IMRR value TH (e.g., across all channels CH). Similarly, calibrating wireless circuitry 24 using all-pass filter 38 may serve to increase the transmit IMRR, the received frequency independent image rejection ratio (FI-IMRR), and the transmit FI-IMRR of wireless circuitry 24. The example of FIG. 5 is merely illustrative. Curves 130 and 132 may have other shapes in practice.

The methods and operations described above in connection with FIGS. 1-5 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry. The components of FIGS. 2 and 3 may be implemented using hardware (e.g., circuit components, digital logic gates, etc.) and/or using software where applicable.

The foregoing is merely illustrative and various modifications can be made to the described embodiments. The foregoing embodiments may be implemented individually or in any combination.

What is claimed is:

1. A radio-frequency transceiver for wirelessly communicating using at least one antenna, the radio-frequency transceiver comprising:
a transmit path having a first mixer configured to up-convert transmit signals from a baseband frequency to a radio frequency for transmission by the at least one antenna;
a receive path having a second mixer configured to down-convert receive signals received using the at least one antenna from the radio frequency to the baseband frequency;
a loopback path coupling the transmit path to the receive path; and
an all-pass filter disposed on the loopback path between the transmit path and the receive path.

2. The radio-frequency transceiver of claim 1, wherein the all-pass filter comprises a first output and a second output, the second output being 90 degrees out-of-phase with respect to the first output.

3. The radio-frequency transceiver of claim 2, further comprising:
a multiplexer having a first input coupled to the first output, a second input coupled to the second output, and a third output communicably coupled to the receive path.

4. The radio-frequency transceiver of claim 3, wherein the loopback path comprises a differential signal path having a first signal line and a second signal line, the all-pass filter having a first input terminal coupled to the first signal line and having a second input terminal coupled to the second signal line.

5. The radio-frequency transceiver of claim 4, wherein the all-pass filter comprises a second order all-pass filter having:
a first all-pass filter stage that couples the first and second input terminals to the first output; and
a second all-pass filter stage that couples the first and second input terminals to the second output.

6. The radio-frequency transceiver of claim 5, wherein the first all-pass filter stage comprises:
a first resistor;
a first capacitor coupled in series with the first resistor between the first input terminal and the second input terminal;
a second capacitor; and
a second resistor coupled in series with the second capacitor between the first input terminal and the second input terminal, wherein the first resistor and the first capacitor are coupled in parallel with the second resistor and the second capacitor between the first input terminal and the second input terminal, the first output being coupled to a first circuit node between the first resistor and the first capacitor and to a second circuit node between the second resistor and the second capacitor.

7. The radio-frequency transceiver of claim 6, wherein the second all-pass filter stage comprises:
a third resistor;
a third capacitor coupled in series with the third resistor between the first input terminal and the second input terminal;
a fourth capacitor; and
a fourth resistor coupled in series with the fourth capacitor between the first input terminal and the second input terminal, wherein the third resistor and the third capacitor are coupled in parallel with the fourth resistor and the fourth capacitor between the first input terminal and the second input terminal, the second output being coupled to a third circuit node between the third resistor and the third capacitor and to a fourth circuit node between the fourth resistor and the fourth capacitor.

8. The radio-frequency transceiver of claim 5, further comprising:
a first balun interposed on the transmit path;
a second balun interposed on the transmit path; and
a power amplifier interposed on the transmit path between the first balun and the second balun, wherein the first signal line and the second signal line are coupled to the transmit path at a location between an output of the power amplifier and the second balun.

9. The radio-frequency transceiver of claim 8, further comprising:
at least one capacitor interposed on the loopback path between the all-pass filter and the transmit path;
a programmable attenuator interposed on the loopback path between the third output of the multiplexer and the receive path; and
a differential-signal-to-single-ended-signal converter interposed on the loopback path between the programmable attenuator and the receive path.

10. An electronic device comprising:
processor circuitry;
at least one antenna;
a transmit path that couples the processor circuitry to the at least one antenna;
a receive path that couples the at least one antenna to the processor circuitry;
a loopback path that couples the transmit path to the receive path; and
a passive all-pass filter interposed on the loopback path between the transmit path and the receive path.

11. The electronic device of claim 10, wherein the processor circuitry is configured to use the passive all-pass filter to calibrate an in-phase quadrature-phase (I/Q) mismatch of the transmit path and the receive path.

12. The electronic device of claim 11, wherein the passive all-pass filter has a first output and a second output, the electronic device further comprising:
a multiplexer interposed on the loopback path and having a first input coupled to the first output, a second input coupled to the second output, and a third output communicably coupled to the receive path.

13. The electronic device of claim 12, wherein the one or more processors is configured to calibrate the I/Q mismatch by:
controlling the processor circuitry to transmit a test signal, the passive all-pass filter being configured to convey the test signal over the first output with a first phase and over the second output with a second phase that is 90 degrees out-of-phase with respect to the first phase;
controlling the multiplexer to couple the first input to the third output;
controlling the processor circuitry to measure the test signal while the first input of the multiplexer is coupled to the third output;
controlling the multiplexer to couple the second input to the third output;
controlling the processor circuitry to measure the test signal while the second input of the multiplexer is coupled to the third output;
controlling the processor circuitry to identify the I/Q mismatch based on the test signal measured while the first input of the multiplexer is coupled to the third output and based on the test signal measured while the second input of the multiplexer is coupled to the third output; and controlling the processor circuitry to generate, based on the identified I/Q mismatch, a compensation value to be applied to subsequently-transmitted signals.

14. The electronic device of claim 12, further comprising:
a first mixer interposed on the transmit path;
a first balun interposed on the transmit path between the first mixer and the at least one antenna;
a power amplifier interposed on the transmit path between the first balun and the at least one antenna;
a second balun interposed on the transmit path between the power amplifier and the at least one antenna, wherein the loopback path is coupled to the transmit path at a location between the power amplifier and the second balun; and
a differential-signal-to-single-ended-signal converter interposed on the loopback path between the multiplexer and the receive path.

15. The electronic device of claim 14, further comprising:
a low noise amplifier interposed on the receive path; and
a second mixer interposed on the receive path between the low noise amplifier and the processor circuitry, wherein the loopback path is coupled to the receive path at a location between the low noise amplifier and the at least one antenna.

16. The electronic device of claim 10, further comprising:
a radio-frequency transceiver module, wherein the loopback path and the passive all-pass filter are on the radio-frequency transceiver module.

17. A loopback path for conveying differential radio-frequency signals from a transmit path in a radio-frequency transceiver to a receive path in the radio-frequency transceiver, the loopback path comprising:

a first signal line coupled to the transmit path;
a second signal line coupled to the transmit path, the first and second signal lines forming a differential pair of signal lines;
an all-pass filter having a first input terminal coupled to the first signal line, a second input terminal coupled to the second signal line, a first output configured to output the differential radio-frequency signals with a first phase, and a second output configured to output the differential radio-frequency signals with a second phase that is 90 degrees out-of-phase with respect to the first phase; and
a multiplexer having a first input coupled to the first output of the all-pass filter, a second input coupled to the second output of the all-pass filter, and a third output communicably coupled to the receive path, the multiplexer having a first state in which the first input is coupled to the third output and having a second state in which the second input is coupled to the third output.

18. The loopback path of claim 17, further comprising:
a differential-signal-to-single-ended-signal converter coupled between the third output and the receive path.

19. The loopback path of claim 18, further comprising:
a programmable attenuator coupled between the third output and the differential-signal-to-single-ended-signal converter.

20. The loopback path of claim 17, wherein the all-pass filter comprises a first stage coupled between the first input terminal, the second input terminal, and the first output, and wherein the all-pass filter comprises a second stage coupled between the first input terminal, the second input terminal, and the second output.

* * * * *

UNITED STATES PATENT AND TRADEMARK OFFICE
CERTIFICATE OF CORRECTION

PATENT NO. : 11,476,889 B2
APPLICATION NO. : 17/191535
DATED : October 18, 2022
INVENTOR(S) : Krishna Chaitanya Reddy Gangavaram and Ali Parsa It is certified that error appears in the above-identified patent and that said Letters Patent is hereby corrected as shown below:

In the Specification

Column 6, Line 17-18, "transmit path 36" should read -- transmit path 28 --

Column 8, Line 51, "receive path 68" should read -- receive path 32 --

Column 8, Line 54-55, "receive path 68" should read -- receive path 32 --

Signed and Sealed this
Twenty-seventh Day of December, 2022

Katherine Kelly Vidal
*Director of the United States Patent and Trademark Office*